United States Patent [19]
Corlett et al.

[11] Patent Number: 5,926,625
[45] Date of Patent: Jul. 20, 1999

[54] SELF-PROGRAMMING SWITCH FOR COMPUTER NETWORKS

[75] Inventors: Andrew Corlett, Rancho Santa Margarita, Calif.; Leung Hon Kit, Singapore, Singapore; Yan Or, San Jose, Calif.; Andrew Fyke, Allen, Tex.

[73] Assignee: Compex, Inc., Anaheim, Calif.

[21] Appl. No.: 08/795,640

[22] Filed: Feb. 6, 1997

[51] Int. Cl.$^6$ .................................................. G06F 13/00
[52] U.S. Cl. ...................................... 395/200.51; 370/232
[58] Field of Search ......................... 395/200.57, 200.58, 395/200.69, 200.71, 200.5, 200.51, 200.54; 370/362, 398, 414, 419, 427, 229, 232

[56] References Cited

U.S. PATENT DOCUMENTS

| | | | |
|---|---|---|---|
| 4,965,718 | 10/1990 | George et al. | 395/674 |
| 5,226,125 | 7/1993 | Balmer et al. | 395/312 |
| 5,345,447 | 9/1994 | Noel | 370/362 |

OTHER PUBLICATIONS

DECchip 21140A PCI Fast Ethernet LAN Controller, Hardware Reference Manual, Digital Equipment Corporation, Maynard, Massachusetts, Oct. 1995, Order No. EC–QN7NB–TE.
Data Networking ICs, Microelectronics Group, Lucent Technologies, Data Book, Sep. 1996.
Gigabit Networking, by Craig Partridge, Addison–Wesley Professional Computing Series.
IEEE Standards for Local and Metropolitan Area Networks: Media Access Control (MAC) Bridges, Mar. 8, 1991.
Interconnections: Bridges and Routers, Radia Perlman, Addison–Wesley Professional Computing Series, IEEE/ACM Transactions on Networking, vol. 2, No. 1, Feb. 1994.
"On the Self–Similar Nature of Ethernet Traffic (Extended Version)", Will E. Leland, Murad S. Taqqu, Walter Willinger, and Daniel V. Wilson, IEEE/ACM Transactions on Networking, vol. 2, No. 1, Feb. 1994.
"3COM Closes in on the Cost of Repeaters with Switch Releases", by Jodi Cohen, Network World, May 8, 1995.
"Compex gives users freedom of E–net switching, repeating", NetworkWorld, by Jodi Cohen, Apr. 29, 1996.
"Balancing the Load", by Eric Lach, Communications Week, Jul. 8, 1996, Internetworking.
"Networking", What's New Hardware, BYTE Dec. 1996.
"The Riches of Switches", by Robert J. Kohlhepp, Network Computing, Jan. 15, 1996.
"ODS to introduce hubs with switching, routing", by Skip Macaskill, Network World, Aug. 18, 1993.
"Testing Memory Quickly", by Bob Ziedman, Embedded Systems Programming, Aug. 1995.
"The Power of Virtual LANs", by Bill Erdman, Internetwork, Feb. 1996.
"Which Switch?", by Tere' Parnell, Special Report LAN Times, Sep. 25, 1995.
"Communications for Cooperating Systems, OSI, SNA, and TCP/IP", by R.J. Cyper, Addison–Wesley Publishing Company.
"Part 3: Carrier sense multiple access with collision detection (CSMA/AC) access method and physical layer specifications", International Standard, ISO/IEC 88–2–3, ANSI/IEEE Std 802.3, Third Edition, 1992–03–20.
Local Area Networks Databook, 1993 Second Edition, Product Status Definitions.
"IEEE Standards for Local and Metropolitan Area Networks: Media Access Control (MAC) Bridges", sponsor Technical Committee on Computer Communications of the IEEE Computer Society.

*Primary Examiner*—Moustafa M. Meky
*Attorney, Agent, or Firm*—Stetina Brunda Garred & Brucker

[57] ABSTRACT

A multiport computer network switch automatically maximizes the data throughput efficiency of the network by periodically reconfiguring the connections between the network segments connected to the ports and the buses that are interconnected by the switch. The reconfiguration is based upon a continual traffic count for each port and distributes the traffic as equally as possible between the buses. Reconfiguration may also be triggered when the data throughput efficiency of any bus drops below a predetermined level.

4 Claims, 4 Drawing Sheets

5,926,625

SELF-PROGRAMMING SWITCH FOR COMPUTER NETWORKS

FIELD OF THE INVENTION

This invention relates to computer network switches, and more particularly to a switch which automatically reconfigures network segments from time to time to maintain optimum data throughput rates under changing usage conditions.

BACKGROUND OF THE INVENTION

In an ideal computer network, any node would be able to communicate with any or all other nodes at any transmission rate at any time. In the real world, this ideal is limited by two basic factors: 1) the signal-carrying bandwidth of the physical communication circuit is finite (e.g. 10 megabits/sec for 10-base T twisted-pair telephone wiring); and 2) any given circuit segment (hub or loop) can only carry one data transfer at a time, i.e. while a communication between two nodes on a segment is in progress, all other nodes on that segment are denied access to the network.

In a typical network such as an Ethernet network, a node wishing to transmit data monitors the communication circuit until it is idle, and then initiates a transmission. Because it takes a small but finite amount of time for the transmission to propagate along the segment wiring, it is possible that another node may see the circuit as idle and start transmitting when in fact a conflicting transmission is already on its way. The result is a collision which corrupts both transmissions.

When a node sees corrupted data indicating a collision, it waits for a random interval and then tries to retransmit the data. Because of the randomness of the interval, there is a high probability that the two nodes will not retransmit at the same time, and the data will get through. The initial transmissions were useless, however, and while they were in progress, the segment was not carrying any valid data. Consequently, if collisions occur, say, 20% of the time, the actual data throughput, or throughput efficiency, of the segment is 80% of the rating of the wiring, i.e. 8 Mb/sec for a 10 Mb/sec twisted pair.

It has been found empirically that in a typical Ethernet network segment or collision domain, collisions do not increase linearly with the number of nodes and the amount of traffic per node. Rather, there is a traffic level, dependent upon the physical characteristics of the network, above which the throughput efficiency drops precipitously and eventually stabilizes at about 18% of rated throughput, i.e. about 1.8 Mb/sec for a 10 Mb/sec pair.

To mitigate this problem, it has been proposed to divide a large network into several smaller segments interconnected by bridges or switches. A bridge between two segments takes data from one segment, stores it, and then transmits it to the other. Thus, the bridge makes each segment look like a single node to the other segment. Because of its method of operation, the bridge does, however, delay the data communication by a latency delay depending upon the length of the data packet and the overhead of the bridge circuitry. This delay is, of course, undesirable for high-speed bidirectional communication.

In general, switches mitigate the delay problem while preserving the segmenting of the network. Typically, switches read the address of an incoming data packet without storing the packet itself, and then route the packet directly to the appropriate one of several outputs. Because only the address bits are read, the latency delay is substantially reduced.

A typical programmable switch may have, for example, a port matrix with 24 ports to which individual port segments of a network can be connected. Each of these ports can be programmed by the network administrator to be connected to one of, e.g., four buses that can be selectively interconnected by the switch, in accordance with the addresses of data packets, so as to route a given packet from one bus to another. The four buses allow two separate interconnections to exist at the same time, and therefore the total throughput of the network is enhanced. However, the fact that several ports are directly connected to a given bus make that bus a single bus segment or collision domain composed of all the port segments that are connected to it.

It is a fact of network life that traffic on any large network is unpredictable. Traffic patterns vary in large swings from minute to minute and hour to hour as node (i.e. workstation) operators come to work, get new tasks, take breaks etc. Consequently, any given bus segment may function efficiently at one time and may be badly overloaded fifteen minutes later. Reprogramming the interconnections between the ports and the buses at frequent intervals to maintain maximum throughput efficiency on the network is too complex a task for a human network administrator.

SUMMARY OF THE INVENTION

The present invention continually maximizes network throughput efficiency in the course of a workday by connecting the segments of the network to a self-programming switch which automatically reconfigures the network at frequent intervals to maintain maximum data throughput efficiency. The invention accomplishes this by monitoring the traffic on each port segment and the actual throughput rate of each bus segment on a minute-by-minute basis, and reconfiguring the port-to-bus interconnections at predetermined intervals or whenever an overload occurs, to optimize the distribution of the port segments among the buses.

DESCRIPTION OF THE PREFERRED EMBODIMENT

Figure 1A:
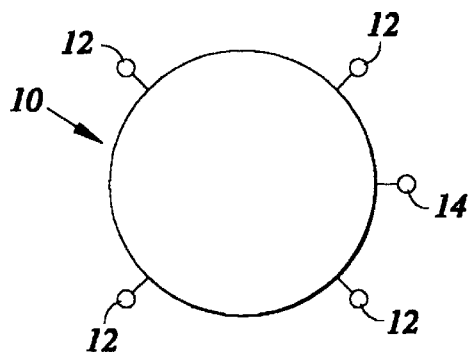
FIGS. 1a and 1b are schematic illustrations of two common types of network segments.
Figure 1B:
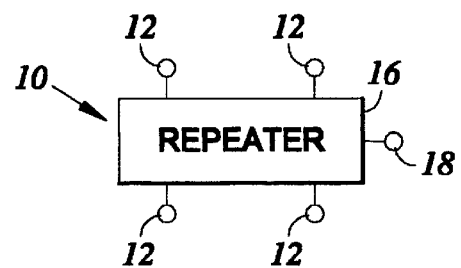

FIGS. 1a and 1b illustrate typical segment configurations of networks such as an Ethernet network. In each figure, 10 designates a network segment (i.e. a loop in FIG. 1a and a hub in FIG. 1b) to which nodes (e.g. workstations or servers) 12 are attached. In FIG. 1a, a node 14 may be a connection to another segment through a bridge or switch, while in FIG. 1b, the repeater 16 which forms the hub interconnecting the nodes 14 typically has an input/output 18 which can be connected to another segment through a bridge or switch.

Figure 2:
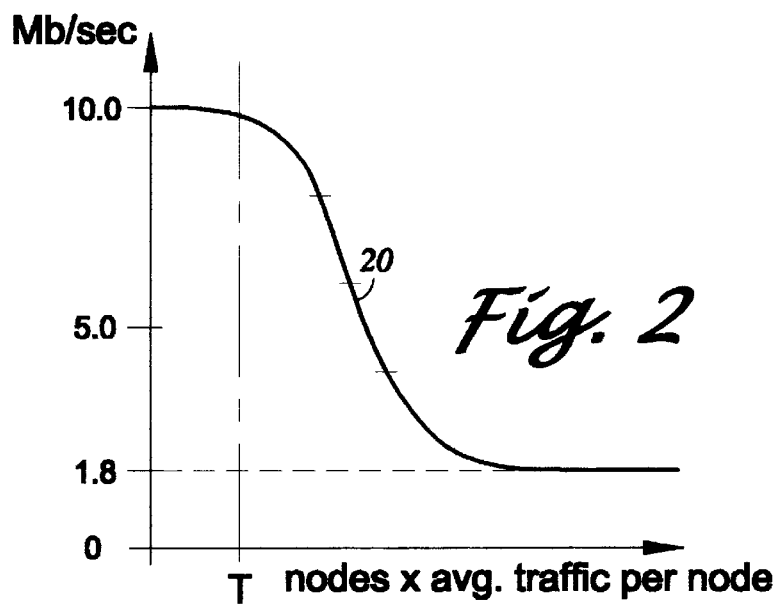
FIG. 2 is a traffic vs. throughput efficiency diagram for a network segment.

FIG. 2 illustrates the effect of traffic on the segment of FIG. 1a or 1b. If the segment 10 is wired with, e.g., 10-base T or other 10-base wiring, its theoretical throughput capacity is 10 Mb/sec, i.e. a maximum total of ten million valid bits of information can be transmitted on the segment each second when the segment is in use full time. In practice, however, it is possible, due to the signal propagation delays on the physical wire, for a node to see an idle condition and start transmitting when in fact a transmission from another had already begun. The result is a collision which corrupts both transmissions and requires both nodes to repeat their transmissions at different times. Because the segment is unavailable for the transmission of valid data during the collision, the theoretical throughput capacity of the segment is reduced.

As will be seen from curve 20 in FIG. 2, the likelihood of collisions does not increase (or, conversely, the throughput capacity decrease) linearly with increasing traffic. Rather, a given physical segment or collison domain can tolerate an increase in average traffic per node times number of nodes up to a point with little throughput capacity deterioration. Beyond that point, the throughput capacity decreases precipitously until it stabilizes at about 18% of theoretical capacity.

Figure 3:
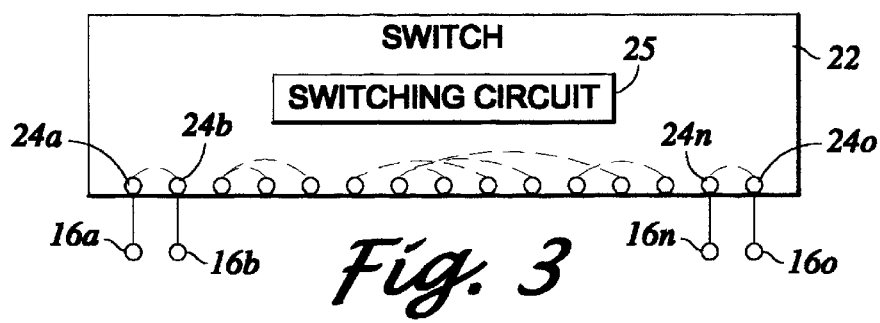
FIG. 3 is a schematic illustration of a 15-port switch.

It is therefore necessary in practice to divide a large network into smaller segments to reduce the number of collisions. These segments are conventionally interconnected by switches such as switch 22 in FIG. 3. The switch 22 may, for example, have fifteen ports 24a through 24o to which segment repeaters 16a through 16o are attached, and a switching circuit 25 which reads the address of each data packet appearing at one of the ports 24a through 24o and connects that port, if necessary, to the proper destination port for the duration of the data packet.

Because it is possible, e.g., for port 24a to be connected to port 24b for a transmission from repeater 16a to repeater 16b while port 24n is simultaneously connected to port 24o for a transmission from repeater 16o to repeater 16n (dotted lines in FIG. 3), the theoretical throughput capacity of the switch 22 with 10-base wiring is 10 Mb/sec×15/2=70 Mb/sec. This is, however, not achievable in practice because network traffic is typically bursty and is not evenly distributed among the possible port combinations. Furthermore, the segments represented by the repeaters 16 cannot operate at 10 Mb/sec because they are not collision-free in practice.

Figure 4:
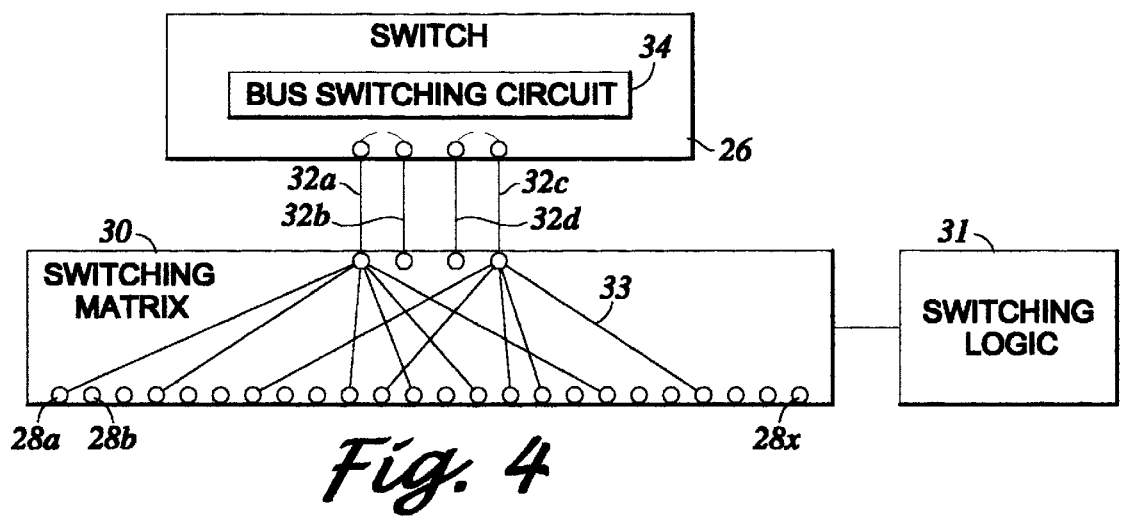
FIG. 4 is a schematic illustration of a four-bus switch with a programmable 24-port connection matrix.

Due to their unrestricted switchability, multiport switches like switch 22 are quite costly because they require a large amount of expensive switching circuitry. Consequently, they are not practical in smaller installations where their cost per port would be prohibitive. In those situations, a programmable matrix switch such as the switch 26 shown in FIG. 4 is preferable. In switch 26, a number of ports, e.g. twenty-four ports 28a through 28x, can be selectively individually connected by the network administrator through a switching matrix 30 to any one of four buses 32a through 32d. The switching matrix 30 is typically controlled by a switching logic 31 that can be operated by the network administrator to configure the matrix 30 as desired. Some illustrative connections 33 to buses 32a and 32d are shown in FIG. 4. The bus switching circuit 34, which is responsive to the addresses of data packets coming into the switch 26, then handles interconnections only between the four buses 32a through 32d. Because of the direct interconnection of a group of ports such as 28a through 28c with a single bus 32a, the individual port segments connected to ports 28a through 28c become a single bus segment or collision domain.

With the switching array controlled by bus switching circuit 34 thus being greatly simplified, the cost of the switch 26 is greatly reduced, compared to switch 22, in exchange for a reduction of the theoretical switch throughput capacity to 10 Mb/sec×4/2=20 Mb/sec. This reduction is offset by an increase in ports which allows the network to be broken down into smaller and therefore more efficient port segments.

Figure 5:
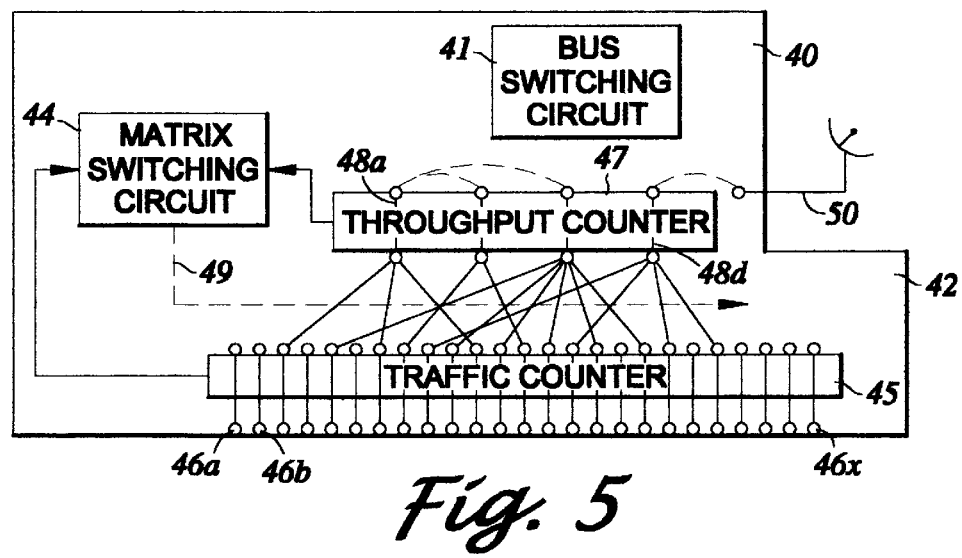
FIG. 5 is a schematic illustration of the self-programming switch of this invention.

Because each bus segment in the switch 26 of FIG. 4 is a combination of an average of six port segments into a single collision domain, a judicious selection of the interconnections between ports 28a–28x and the buses 32a–32d is necessary to keep collisions on each bus segment to a minimum. The problem is that traffic on each port segment varies widely over both short and long time intervals, so that an efficient selection at one time may be very inefficient fifteen minutes later. The present invention solves this problem by the system shown in FIG. 5.

In the switch 40 of FIG. 5, the switch 40 is again conventionally controlled by a bus switching circuit 41, but in the switch 40, the matrix 42 is controlled by its own matrix switching circuit 44. The input to matrix switching circuit 44 is of two kinds: first, each port 46a through 46x is monitored in one-minute increments by a traffic counter 45, and the traffic count on that port for a given minute is averaged with the traffic count for that port that was applied to the microprocessor 44 for the preceding minute. The resulting averaged traffic count (which is thus a weighted historical average of the traffic on that port) is now applied as an input to the matrix switching circuit 44 for the current minute. Secondly, the actual throughput of valid data per second may be continually measured by a throughput counter 47 for each of the buses 48a through 48d, and may also be applied to the matrix switching circuit 44 as a second input.

Figure 6A:
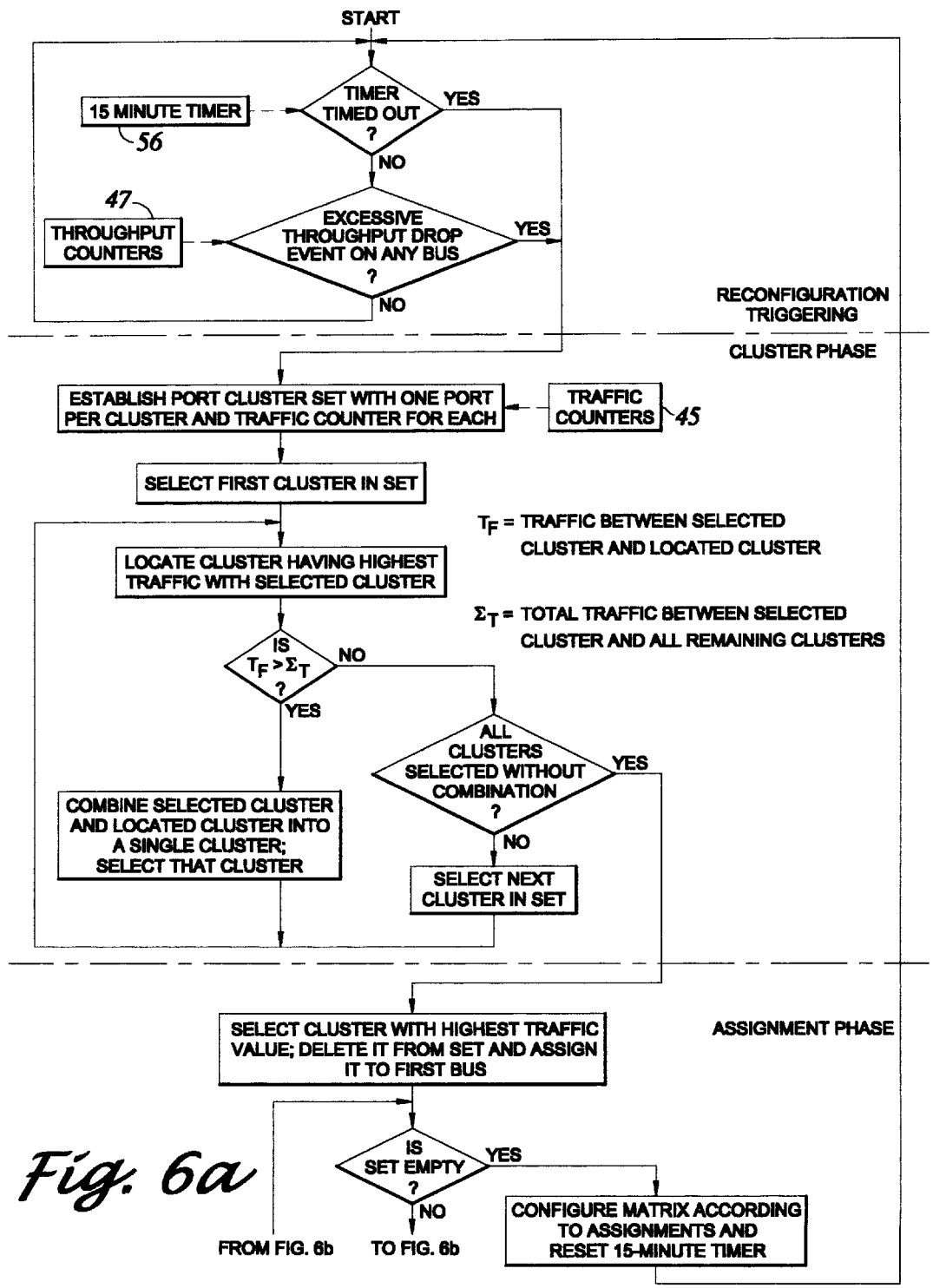
FIGS. 6a and 6b together are a flow diagram illustrating the self-programming algorithm of this invention.
Figure 6B:
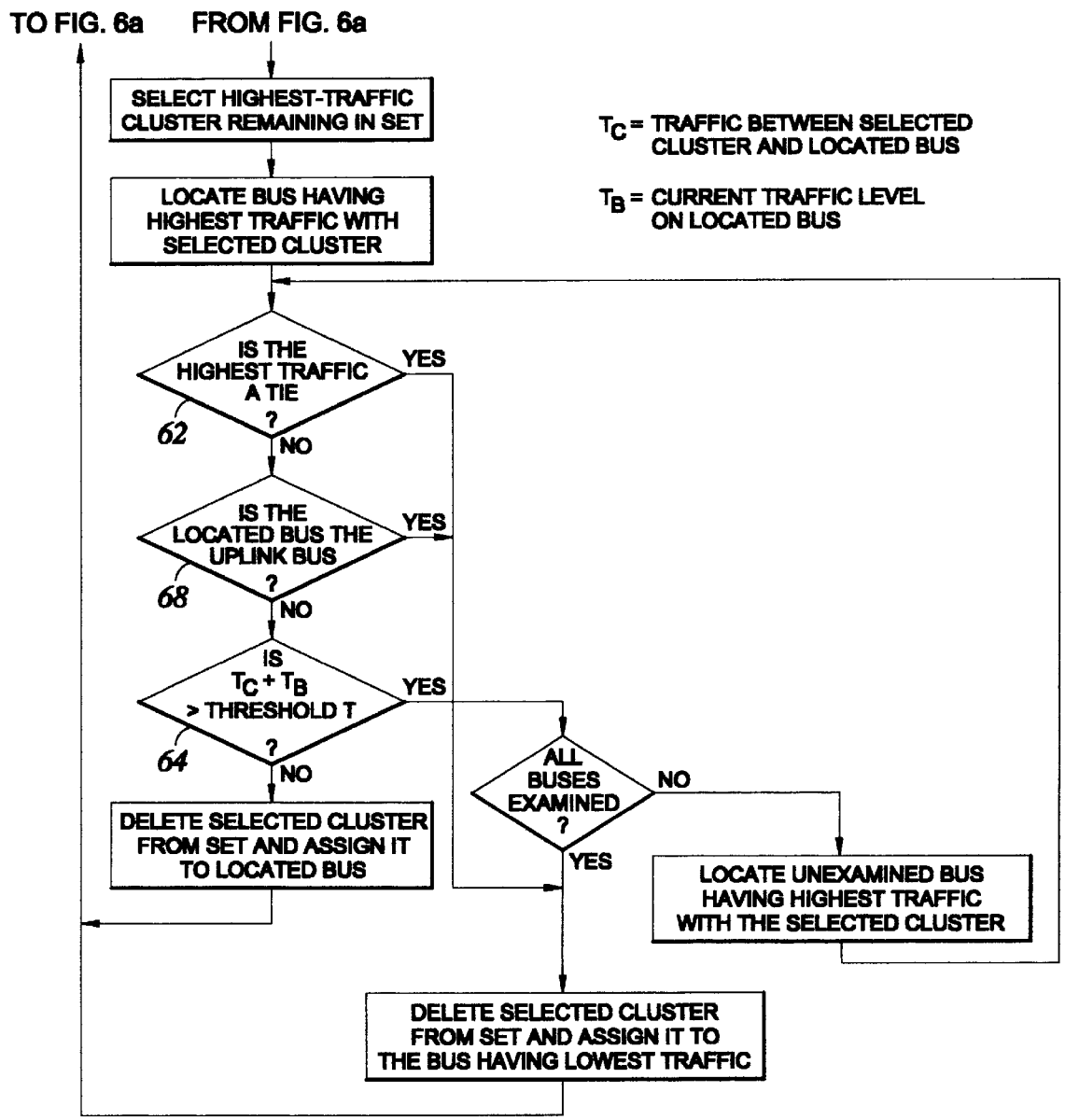

As shown in the flow diagram of FIGS. 6a and 6b, the matrix switching circuit 44 is arranged to trigger a reconfiguration of the matrix 42 (symbolized by the dotted arrow 49 in FIG. 5) every fifteen minutes, or it may be triggered earlier if enough collisions occur on any of the bus segments to reduce that bus' throughput to 50% or less of theoretical capacity. The latter triggering preferably occurs only if the drop is from about 60% in order to prevent frequent triggering by small fluctuations around the 50% mark.

The matrix switching algorithm illustrated in FIGS. 6a and 6b has two phases: a clustering phase 52 and an assignment phase 54. In the following discussion, groups of port segments that are connected together upon reconfiguration of the matrix 42 are referred to as clusters.

Reconfiguration begins with the clustering phase 52. At the start of the clustering phase 52, each of the twenty-four port segments is considered to be a separate cluster in a cluster set. The matrix switching circuit selects the first cluster of that set and locates the cluster that has the highest traffic with the selected cluster. If the traffic between these two clusters is greater than the traffic between the selected cluster and all the remaining clusters put together, then the two clusters are combined into a single new combination cluster that replaces the two original clusters in the set. The combination cluster now becomes the selected cluster, and the procedure is repeated. If the two clusters are not combinable, they remain separate in the set, and the next cluster in the set is selected.

This procedure is now iteratively repeated until the set contains no more combinable clusters. At that point, the algorithm goes into the assignment phase. In this phase, the algorithm first selects the cluster with the highest total traffic count, deletes it from the cluster set, and assigns it to the first bus. It then selects the highest-traffic remaining cluster in the set and locates the bus which has the most traffic with the now selected cluster. The algorithm then determines whether that cluster's traffic, if added to the traffic already on the located bus, would exceed the threshold T of FIG. 2. If the answer is no, the selected cluster is removed from the set and assigned to the located bus. If the answer is yes, the threshold evaluation is iteratively repeated using the available (i.e. still unexamined) bus which has the highest traffic with the selected cluster.

If addition of the selected cluster would exceed the threshold on all buses, it is deleted from the cluster set and assigned to the bus which has the least total traffic.

The assignment procedure is now repeated until all the clusters in the cluster set have been assigned, and the cluster set is empty. The matrix switching circuit then configures the matrix in accordance with the assignments, and resets the 15-minute trigger timer 56.

A special situation arises when a tie occurs, i.e. there is more than one cluster (in the clustering phase 52) or bus (in the assignment phase 54), during an iteration, that has the highest traffic with the selected cluster, or the lowest total traffic (for assignment purposes). Initially, whenever a tie in the traffic count occurs, the tied cluster or bus with the lowest position number in the cluster set or bus array is chosen. In the clustering phase 52, this causes no problem because in such a situation, $T_F$ in conditional branch 60 mathematically cannot be greater than $\Sigma_T$, and the selected cluster remains uncombined in the cluster set.

In the assignment phase 54, conditional branch 62 bypasses the threshold evaluation of conditional branch 64 when there is a tie for the highest bus traffic with the selected cluster, and simply assigns the cluster to the bus with the lowest traffic.

In an optional modification of the switch 40, a separate high-capacity (e.g. 100 Mb/sec) dedicated bus 50 connected to a satellite uplink or the like may be incorporated into the switch 40. If that is the case, it is desirable to distribute traffic going to the uplink bus 50 as evenly as possible between the other buses so as to obtain maximum utilization of the uplink's high capacity. The bus 50 itself cannot be directly connected to any of the port segments; consequently, conditional branch 68 (FIG. 6b) is provided to sequentially distribute among the buses 48a through 48d those port segments whose major traffic is with the uplink bus 50, without significantly affecting the throughput efficiency maximizing routines of the algorithm of FIGS. 6a and 6b. The conditional branch 68 also has the effects of evenly distributing among the buses 48a through 48d those port segments which communicate only with bus 50 (and therefore have an equal traffic of zero with all the other four buses).

It will be seen from the foregoing that a network using the self-programming switch of this invention will continually adjust its configuration throughout the day to achieve the maximum overall data throughput in limited-budget networks under greatly varying network conditions.

It is understood that the exemplary computer network switch described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A method of automatically configuring a connection matrix in a computer network to maximize the data throughput efficiency of said network, said matrix being arranged to selectably connect a first plurality of port segments of said computer network to a second plurality of selectively interconnectable buses, comprising the steps of:

a) continually measuring the data traffic on each of said port segments; and b) periodically reconfiguring said matrix in response to said measured traffic to distribute said port segment traffic as equally as possible between said buses, c) said reconfiguring step including:

i) iteratively combining port segments that have a high rate of traffic between them into combination clusters; and ii) iteratively assigning each of said combination clusters and uncombined port segments, in order of its traffic level, to the available bus having the most traffic therewith if the addition of said combination cluster or port segment does not cause the traffic on said bus to exceed a predetermined threshold;

iii) iteratively assigning each of said combination clusters and uncombined port segments, in order of its traffic level, to the bus having the least amount of traffic, if said combination cluster or port segment cannot be added to any bus without exceeding said threshold on that bus; and iv) configuring said matrix in accordance with said assignments.

2. The method of claim 1, in which one of said buses is a high-capacity bus having a higher throughput capacity than said port segments, and said reconfiguring step further includes:

v) so distributing those combination clusters or uncombined port segments having the highest traffic with said high-capacity bus between the others of said buses as to maximize utilization of the capacity of said high-capacity bus while minimizing any degradation of the throughput efficiency of said network.

3. The method of claim 2, in which said distributing is accomplished by iteratively assigning each of said combination clusters and uncombined port segments, in order of its traffic level, to the one of said others of said buses having the least amount of traffic, whenever the bus having the most traffic with said cluster or segment is said high-capacity bus.

4. The method of claim 1, in which each of said combination clusters or uncombined port segments is assigned, in order of its traffic level, to the bus having the least amount of traffic, if more than one bus has the most traffic with said cluster or segment.

* * * * *